April 7, 1925.
S. W. SMITH
FISHHOOK
Filed March 19, 1924
1,533,044
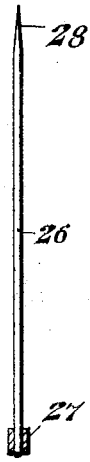
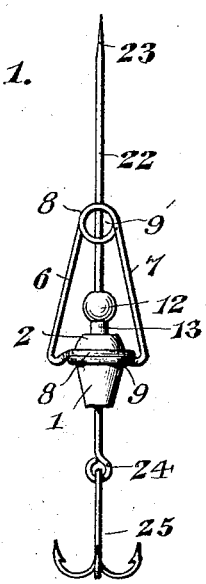
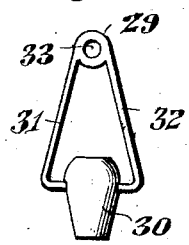
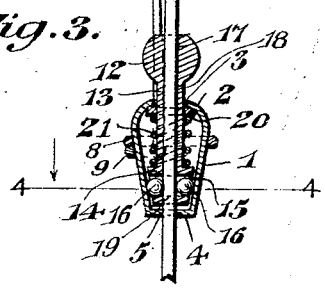
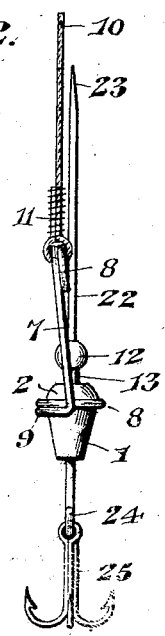
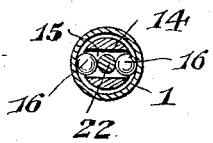
S. W. Smith, INVENTOR.
BY Geo. P. Kimmel, ATTORNEY.

Patented Apr. 7, 1925.

1,533,044

UNITED STATES PATENT OFFICE.

SAMUEL W. SMITH, OF FULLERTON, CALIFORNIA.

FISHHOOK.

Application filed March 19, 1924. Serial No. 700,268.

*To all whom it may concern:*

Be it known that I, SAMUEL W. SMITH, a citizen of the United States, residing at Fullerton, in the county of Orange and State of California, have invented certain new and useful Improvements in Fishhooks, of which the following is a specification.

This invention relates to fish hooks, more particularly to a combined holder and clutching device for removably connecting the hook to a line, and has for its object to provide, in a manner as hereinafter set forth, a device for use in angling and having means whereby bait can be expeditiously changed when occasion requires and further to accommodate for different lengths of live bait, as well as providing for the quick substitution of hooks of different sizes, and for quickly and removably connecting spinners or spoons to the line when desired.

Further objects of the invention are to provide a combined holder and clutching device for use in angling, and which is simple in its construction and arrangement, strong, durable, compact, thoroughly efficient and convenient in its use, and comparatively inexpensive to manufacture.

With the foregoing and other objects in view the invention consists of the novel construction, combination and arrangement of parts, as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is an elevation of a combined holder and clutching device in accordance with this invention.

Figure 2 is a view similar to Figure 1 showing the adaptation of the combined holder and clutching device in connection with a fishing line.

Figure 3 is a fragmentary view in vertical section of the combined holder and clutching device.

Figure 4 is a section on line 4—4 of Figure 3.

Figure 5 is an elevation of a modified form of adjustable hanger rod or stem.

Figure 6 is an elevation of a modified form of holder.

Referring to Figures 1 to 4 of the drawings, the combined holder and clutching device includes a holder element, a clutching element coacting with the holder, and a hanger rod or stem which is lengthwise adjustable with respect to said element and holder and extends medially therethrough.

The holder consists of a hollow tapered body portion 1 having a rounded top 2 formed with a centrally disposed opening 3 and further including a flat bottom 4, provided with a central opening 5, which is of less diameter than and is arranged in alinement with respect to the opening 3 at the top of the body portion 1.

Forming a part of the holder is a connecting member formed from a single length of wire bent to provide a pair of oppositely extending downwardly and outwardly inclined arms 6, 7 connected together at their upper ends by a coiled portion 8, which provides an eye 9'. The lower end of each of the arms 6, 7 is extended inwardly and bent around the body portion 1 as at 8, 9 respectively. The portions 8, 9 of the connecting member are welded or otherwise secured to the body portion 1.

The eye 9' provides means whereby the line 10 can be secured to the connecting member, in the manner as indicated at 11.

The arms 6, 7, extend at an outward inclination with respect to the axis of the body portion 1, so that the eye 9' will be offset with respect to said axis, as indicated in Figure 2.

The clutching element comprises a semispherical head 12, a cylindrical shank 13 depending therefrom, and a foot piece 14 which is of tapered contour and projects laterally in opposite directions from the lower end of the stem or shank 13. The foot piece 14 is formed with an opening 15 extending at right angles with respect to the stem or shank 13 and arranged in said opening 15 is a pair of globular clutching members 16 which coact with the inner face of the body portion 1 to set up a clutching action upon the hanger rod or stem to be presently referred to.

The head 12 is formed with an axial bore 17, which communicates with an axial bore 18 formed in the shank or stem 13 and said bore 18 communicates with the opening 15. The foot piece 14 has its bottom provided with an opening 19 which leads from the opening 15.

Carried by the stem or shank 13, is a disk or collar 20 and between which and the foot piece 14 is arranged a coiled spring 21, which surrounds the stem or shank 13.

The hanger rod or stem, which extends through the clutching element and body portion 1, as indicated at 22, is cylindrical in cross section and of a diameter to have a snug sliding fit with the walls of the bores 17 and 18 and openings 5 and 19. The rod is of greater length than the combined length of the connecting member and body portion 1 and further of a length to accommodate live bait of varying lengths, and can be adjusted to depend the desired distance from the bottom of the body portion 1.

The upper end of the rod 22 is pointed as at 23, and at its lower end is provided with an eye 24, for connecting the hooks 25 therewith. The rod 22 is removably connected to the holder by the clutching element, and the latter acts to prevent the withdrawal of the rod when a pull is in a direction toward the lower end thereof, or in other words, when the spring 21 is extended, as shown in Figure 3, the clutching element, in connection with the body portion 1, will prevent the moving of the rod in a direction towards the bottom of the holder, but not in a direction towards the connecting member. When it is desired to release the rod 22, the clutching element is pulled in a direction whereby the foot 14 thereof will be moved towards the top 2 of the body portion 1, which releases the clutching members 16 and the rod can then be withdrawn from the holder. The pointed end 23 of the rod facilitates the entrance thereof when inserting it into the holder and clutching element.

In the modified form shown in Figure 5, which illustrates a hanger rod or stem, indicated at 26, of the same construction as that shown in Figures 1, 2 and 3, with this exception, that the eye 24 is dispensed with, and the lower end of the rod 26, has fixed thereto a sleeve 27, for the purpose of detachably connecting to the rod, different sized hooks, spoons or spinners. The rod 26 is withdrawn from the holder, and the hook, spoon or spinner, is inserted thereon from the pointed end 28 of the rod and the diameter of the eye or loop of the hook, spinner or spoon, is such as to prevent the withdrawing of the hook, spinner or spoon from the lower end of the rod 26, due to the enlarged sleeve 27, against which rests the eye or loop of the hook, spoon or spinner.

Referring to Figure 6, which illustrates a modified form of holder, the construction is the same as that shown in connection with Figures 1, 2 and 3, with this exception, that the connecting member, indicated at 29, is an integral portion of the holder and said connecting member includes a pair of oppositely disposed inclined arms and an eye. In the form shown in Figure 6, 30 indicates the body portion of the holder, 31, 32 the arms of the connecting member which are formed integral with the body portion 30 and 33 indicates the eye to which the line 10 is attached. The connecting member 29 and body portion 30 are cast in one piece.

It is thought that the many advantages of a combined holder and clutching device for removably connecting a fish hook with a line for the purpose referred to can be fully understood from the construction described, and although the preferred embodiment of the invention is as illustrated and described, yet it is to be understood that changes in the details of construction can be had which will fall within the scope of the invention as claimed.

What I claim is:

1. A device for the purpose set forth comprising a holder having projected from its upper portion a connecting member for securing the holder to a line, said holder apertured at its top and at its bottom, a spring controlled shiftable clutching element arranged within and coacting with the inner face of the body portion and further projecting through and above the apertured top of the latter, and a hanger rod extending through said element and holder and further of greater length than the combined length of said connecting member, element and holder, said hanger rod having its lower end provided with means for connecting a fishing appliance therewith, and said hanger rod further detachably connected to the holder by said clutching element, said hanger rod having a pointed upper end.

2. A device for the purpose set forth comprising a holder including a hollow tapered body portion and a connecting member projecting above said body portion and having its upper end offset with respect to the longitudinal center of the body portion and further having means for connecting a line thereto, a spring controlled shiftable clutching element arranged within and coacting with the inner face of the body portion and further projecting through and extending above the top of the body portion, and a hanger rod extending through said element and holder and of a length greater than the combined length of said connecting member, body portion and element, said rod having its lower end provided with means for connecting a fishing appliance therewith and further engaged by said clutching element whereby the rod is detachably secured to said body portion.

3. A device for the purpose set forth comprising a holder including a hollow tapered body portion and a connecting member projecting above said body portion and having its upper end offset with respect to the longitudinal center of the body portion and further having means for connecting a line thereto, a spring controlled shiftable clutching element arranged within and coacting with the inner face of the body portion and further projecting through and extending above the top of the body portion and a hanger rod extending through said element and holder and of a length greater than the combined length of said connecting member, body portion and element, said rod having its lower end provided with means for connecting a fishing appliance therewith and further engaged by said clutching element whereby the rod is detachably secured to said body portion, said rod having its upper end pointed.

In testimony whereof, I affix my signature hereto.

SAMUEL W. SMITH.